United States Patent

Ishida et al.

[11] Patent Number: 5,229,830
[45] Date of Patent: Jul. 20, 1993

[54] DOPPLER VELOCIMETER

[75] Inventors: Yasuhiko Ishida, Tokyo; Makoto Takamiya, Kawasaki; Hidejiro Kadowaki; Hiroshi Sugiyama, both of Yokohama, all of Japan

[73] Assignee: Canon Kabushiki Kaisha, Tokyo, Japan

[21] Appl. No.: 702,427

[22] Filed: May 20, 1991

[30] Foreign Application Priority Data

May 21, 1990 [JP] Japan .................. 2-130622

[51] Int. Cl.$^5$ .............................................. G01P 3/36
[52] U.S. Cl. ........................................ 356/28.5; 356/356
[58] Field of Search ................................ 356/28.5, 356

[56] References Cited

U.S. PATENT DOCUMENTS

| | | | |
|---|---|---|---|
| 3,419,330 | 12/1968 | Schneider | 356/28.5 |
| 3,604,804 | 9/1971 | Penney | 356/28.5 |
| 4,470,696 | 9/1984 | Ballard | 356/28.5 |
| 4,721,385 | 1/1988 | Jelalian et al. | 356/28.5 |
| 4,940,330 | 7/1990 | Dopheide et al. | 356/28.5 |
| 4,990,791 | 2/1991 | Nishi | 356/28.5 |
| 5,047,653 | 9/1991 | Garcia et al. | 356/28.5 |

FOREIGN PATENT DOCUMENTS

| | | |
|---|---|---|
| 0127244 | 12/1984 | European Pat. Off. |
| 0302444 | 2/1989 | European Pat. Off. |
| 0391278 | 10/1990 | European Pat. Off. |

OTHER PUBLICATIONS

Mazumder, Appl. Physics Lett., Jun. 1, 1970, vol. 16, No. 11, p. 464.

Primary Examiner—Stephen C. Buczinski
Attorney, Agent, or Firm—Fitzpatrick, Cella, Harper & Scinto

[57] ABSTRACT

An apparatus for detecting the speed information of an object comprises a light source device, a frequency shifting device for shifting the frequency of a light flux from the light source device, a light-flux dividing device for dividing a light-flux whose frequency is divided by the frequency shifting device, one of the divided light fluxes divided by the light-flux dividing device being projected onto an object to be measured and the other light flux being projected in a direction other than that of the one of the light fluxes, a first detection device for detecting light from the object to be measured to which the one of the light fluxes is projected, the light detected by the first detection device having undergone a Doppler shift proportional to the speed of the object to be measured, a second detection device for detecting the other light flux, and a speed information detection device for detecting the speed information of the object to be measured on the basis of the comparison between the detection results of the first and second detection devices.

22 Claims, 6 Drawing Sheets

DOPPLER VELOCIMETER

BACKGROUND OF THE INVENTION

1. Field of the Invention

The present invention relates to an apparatus for detecting the information on the displacement of a moving object or a fluid (hereinafter referred to as a moving object), or a velocimeter that measures the speed of a moving object, without contact. More particularly, it relates to a Doppler velocimeter that detects the shift of a frequency of illuminating light.

2. Related Background Art

As an apparatus that measures the movement speed of a moving object without contact and with a high degree of accuracy, a Doppler velocimeter has previously been known. The Doppler velocimeter applies illuminating light, such as a laser beam or the like, to a moving object and measures the movement velocity of the above moving object by utilizing the effect whereby the frequency of scattered light from the moving object shifts proportionally to the movement velocity, the so-called Doppler effect.

Figure 1:
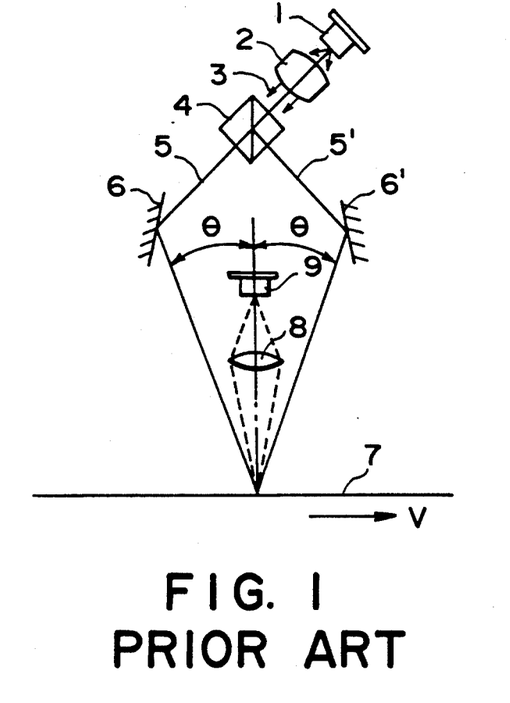
FIG. 1 is a view showing the construction of a conventional Doppler velocimeter.

A typical construction of a laser Doppler velocimeter is shown in FIG. 1 by way of an example of a conventional Doppler velocimeter.

In FIG. 1, reference numeral 1 denotes a laser beam source; reference numeral 2 denotes a collimator lens; reference numeral 3 denotes parallel light fluxes; reference numeral 4 denotes a beam splitter; reference numerals 6 and 6' each denote a mirror; reference numeral 7 denotes a moving object, which object or fluid moves in the direction of the arrow at a velocity V; reference numeral 8 denotes a condenser lens; and reference numeral 9 denotes a photodetector.

A laser beam emitted from the laser beam source 1 is made into the parallel light fluxes 3 by means of the collimator lens 2. The laser beam is then divided into two light fluxes 5 and 5' by means of the beam splitter 4. After the laser beam is reflected by the mirrors 6 and 6', the two light fluxes are projected to a moving object 7 at an incident angle $\theta$ at a velocity V. Scattered light from the moving object or fluid is detected by the photodetector 9 via the condenser lens 8. The frequency of the scattered light from the two light fluxes undergoes a Doppler shift of $+\Delta f$ and $-\Delta f$, respectively, in proportion to the movement velocity V. If the wavelength of the laser beam is made to be $\lambda$, f can be expressed by the following equation (1):

$$\Delta f = V \sin \theta / \lambda \quad (1)$$

The scattered light which undergoes the Doppler shift of $+\Delta f$ or $-\Delta f$ interferes with each other, causing changes in light and darkness on the light-receiving surface of the photodetector 9. The frequency F of the scattered light is given by the following equation (2):

$$F = 2f = 2V \sin \theta / \lambda \quad (2)$$

Therefore, the measurement of the frequency (hereinafter referred to as a Doppler frequency) of output signals of the photodetector 9 enables the velocity V of the moving object 7 to be determined on the basis of equation (2).

In the laser Doppler velocimeter of the prior art as described above, as can be seen from equation (2), the Doppler frequency F is inversely proportional to the wavelength $\lambda$ of the laser. Therefore, it is required that a laser beam source, the laser of which is stable, be used for a laser Doppler velocimeter. As a laser beam source in which continuous oscillation is possible and the laser of which is stable, a gas laser using He-Ne or the like is often used. However, its laser oscillator is large and a high voltage is required for the power supply. This presents the problem that the apparatus is large and expensive. Although laser diodes (or semiconductor lasers) used in compact discs, video discs, optical fiber communication, and so forth are ultrasmall and can be easily driven, they are dependent on temperatures.

Figure 2:
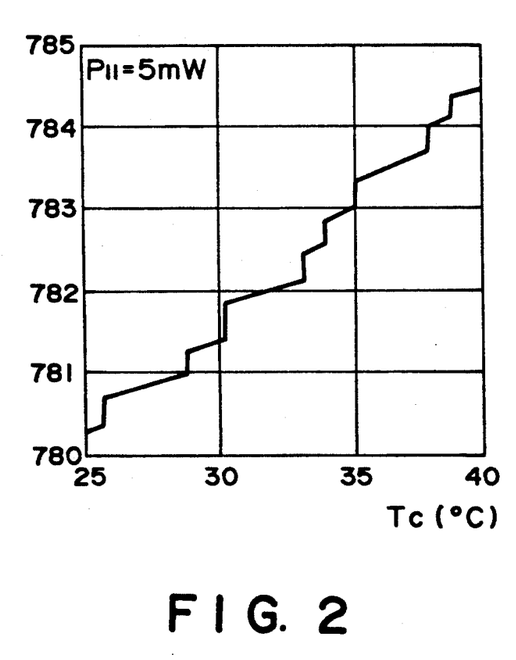
FIG. 2 is a view showing the characteristics of a semiconductor laser.

FIG. 2 (quoted from Photosemiconductor Elements Part, "'87 Mitsubishi Semiconductor Data Book") shows an example of standard temperature dependency of laser diodes. The section where the wavelength changes continuously is mainly caused by changes in the refractive index of the active layers of laser diodes due to temperature, which is 0.05 to 0.06 nm/°C. The section where the wavelength is changed uncontinuously is called vertical mode hopping, which is 0.2 to 0.3 nm/°C.

To stabilize the wavelength, a method of controlling laser diodes at a constant temperature is generally used. In this method, temperature control members, such as heaters, radiators, temperature sensors, or the like, are mounted on laser diodes with a small resistance to heat, and it is required that temperature control be performed precisely. Laser Doppler velocimeter are relatively large, and costs will rise. Furthermore, instability due to the above-mentioned vertical mode hopping cannot be completely eliminated.

Therefore, the present applicant proposed in U.S. Patent application Ser. No. 501,499 a laser Doppler velocimeter which solves the above-mentioned problems and which comprises the steps of applying a laser beam as a light source to diffraction grating, applying two diffracted lights of the +n-th order and −n-th order (n:1, 2, . . . among diffracted lights thus obtained other than that of the zero-order to a moving object at an intersection angle which is the same as the angle made by the two light fluxes, and detecting the scattered light from the moving object by using a photodetector. This method will now be explained.

Figure 3:
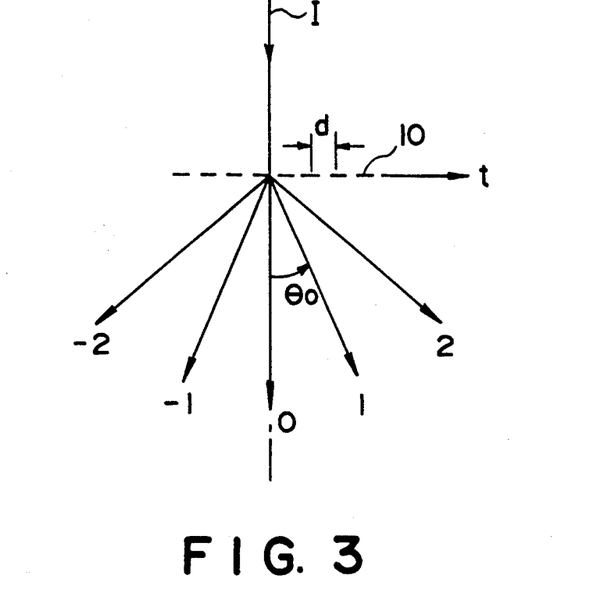
FIG. 3 is an explanatory view of the diffraction grating.

FIG. 3 shows an example of diffraction when a laser beam I is projected onto a transmission type diffraction grating 10 having a grating pitch d to be perpendicular to the direction t in which the grating is arrayed. In such a case, diffraction angle $\theta_0$ becomes as shown in the following equation:

$$\sin \theta_0 / \lambda = m\lambda/d$$

where m:diffraction order (0, 1, 2, . . .), $\lambda$:wavelength of the beam.

$\pm$n-th order beams other than the zero-order beam are expressed by the following equation (3):

$$\sin \theta_0 = \pm n\lambda/d \quad (3)$$

where n:1, 2, . . . .

Figure 4:
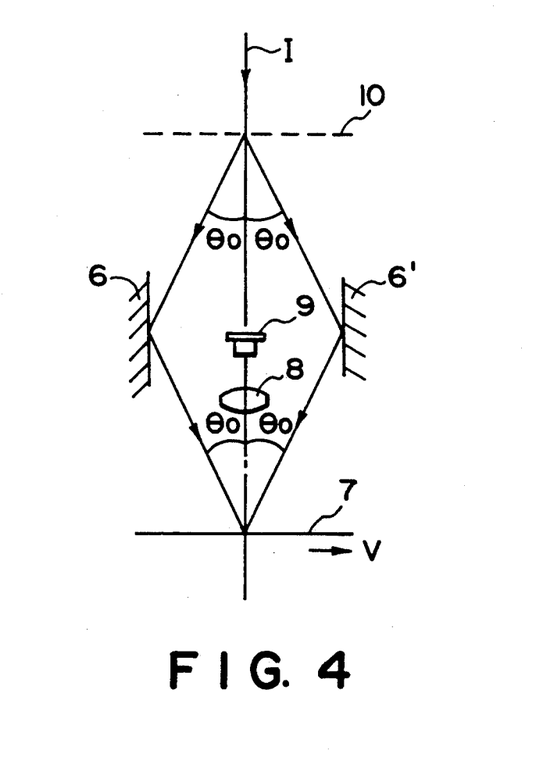
FIGS. 4 and 5 are views showing the construction of the Doppler velocimeter which the present applicant has proposed.

FIG. 4 is a view showing a case in which two light fluxes are applied to a specimen object 7 by means of mirrors 6 and 6' in such a way that an incident angle becomes $\theta_0$. The Doppler frequency F of the photodetector 9 is expressed by the following equation (4) by using equations (2) and (3):

$$F = 2V\sin\theta_0/\lambda = 2nV/d \qquad (4)$$

Thus, the Doppler frequency F does not depend on the wavelength λ of the laser beam I. This frequency is inversely proportional to the grating pitch d of the diffraction grating 10 and proportional to the speed of the specimen object 7. Since the grating pitch d can be made satisfactorily stable, a frequency which is proportional to only the speed of the moving object 7 can be obtained for the Doppler frequency F. The same is true even when a reflection type diffraction grating is used for the diffraction grating 10. As described above, an optical system is formed in which $\sin\theta_0/\lambda$ having an incident angle which is made to be $\theta_0$ becomes constant. Thus, a high-precision measurement which is not dependent on a wavelength can be realized.

If light having a generally high coherency, such as a laser beam or the like, is applied to an object, scattered light undergoes a random phase modulation due to very small irregularities on the surface of the object, and a speckled pattern is formed on the observation surface. When an object or a fluid moves in the laser Doppler velocimeter, changes in light and darkness due to the Doppler shift are modulated by irregular changes in light and darkness due to the flow of the speckled pattern on the detection surface of the photodetector. Also, the output signal of the photodetector is modulated by changes in the transmittance (or reflectance) of the specimen object.

In the above-mentioned G-LDv, the frequency of changes in light and darkness due to the flow of the speckled pattern and the frequency of changes in the transmittance (or reflectance) of a specimen object are generally lower than the Doppler frequency expressed by the above equation (4). Therefore, a method is used in which low-frequency components are electrically eliminated by making the output of the photodetector pass through a high-pass filter so that only Doppler signals are extracted. If the speed of the specimen object is slow and the Doppler frequency is low, the frequency difference between the Doppler frequency and low-frequency components becomes small. In order to deal with a case where a high-pass filter cannot be used or it is desired to detect the direction of the speed, the present applicant proposed in United States Patent application Ser. No. 501,499 the apparatus shown in FIG. 5.

Figure 5:
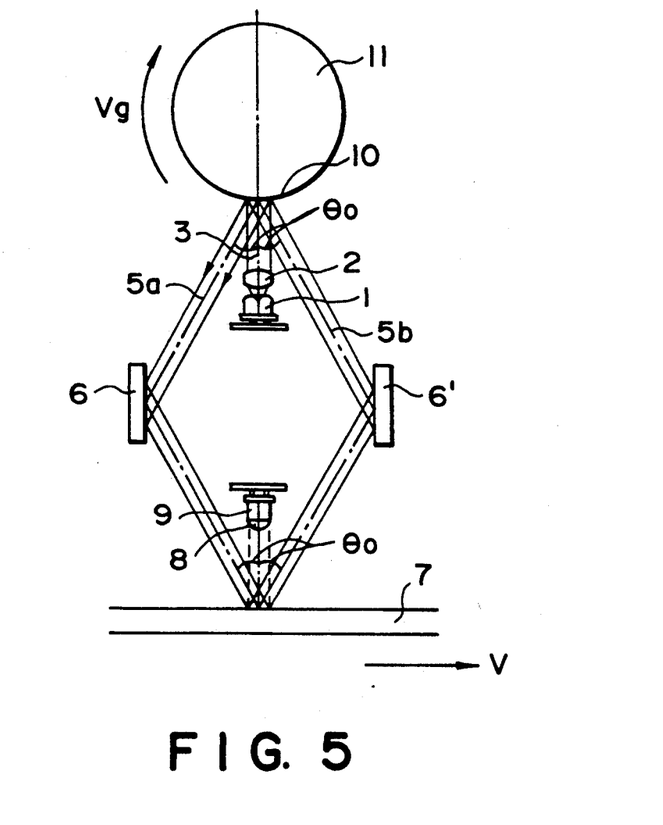

A diffraction grating having a grating pitch d is moved at a velocity Vg, as shown in FIG. 5. When a laser beam is projected onto the moving diffraction grating, the laser beam is divided into ±n-th order diffracted lights 5a and 5b. Each of the lights undergoes positive and negative Doppler shifts ±Vg/nd, respectively. If the wavelength of the light is made to be λ, the diffraction angle $\theta_0$ satisfies the following condition:

$$\sin\theta_0 = \lambda/nd \qquad (5)$$

When these two light fluxes are made incident on the specimen object 7 at a velocity V by means of mirrors 6 and 6' using these ±n-th order lights in such a way that the incident angle becomes $\theta_0$, concerning the scattered light from the specimen object 7, +n-th order light undergoes a Doppler shift of (Vg+V)/nd and -n-th order light undergoes a Doppler shift of −(Vg+V)/nd. These lights interfer with each other, and the Doppler frequency F becomes the following:

$$F = 2(Vg+V)/nd \qquad (6)$$

Thus, a Doppler frequency which is not dependent on the wavelength of the laser beam can be obtained. That is, even if the velocity of the specimen object 7 is slow, the frequency difference between the Doppler frequency and low-frequency components resulting from the flow of the speckled pattern or from the changes in the transmittance (or reflectance) of the specimen object can be satisfactorily extracted by the movement velocity Vg of the diffraction grating. Velocity detection is made possible by a method in which low-frequency components are electrically eliminated by making the output of the photodetector pass through a high-pass filter so that only Doppler signals are extracted.

Figure 6A:
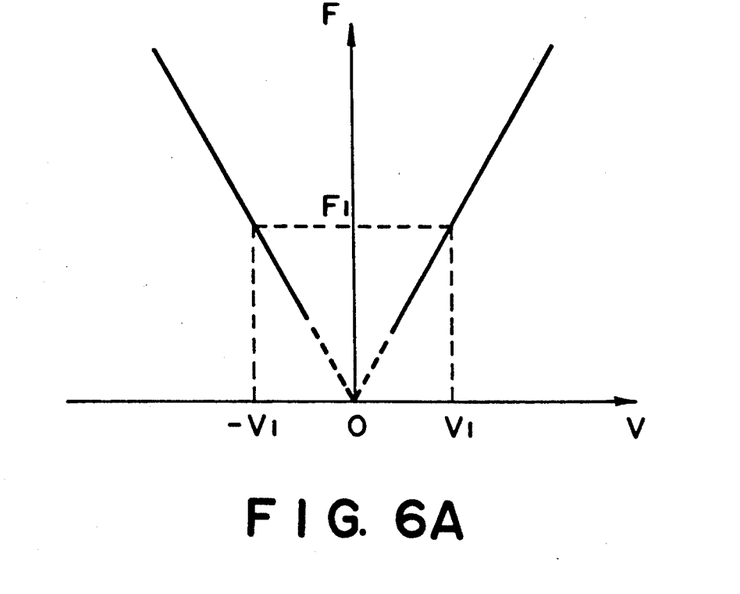
FIGS. 6A and 6B are views showing the relationship between the velocity V of a moving object and the Doppler frequency F.
Figure 6B:
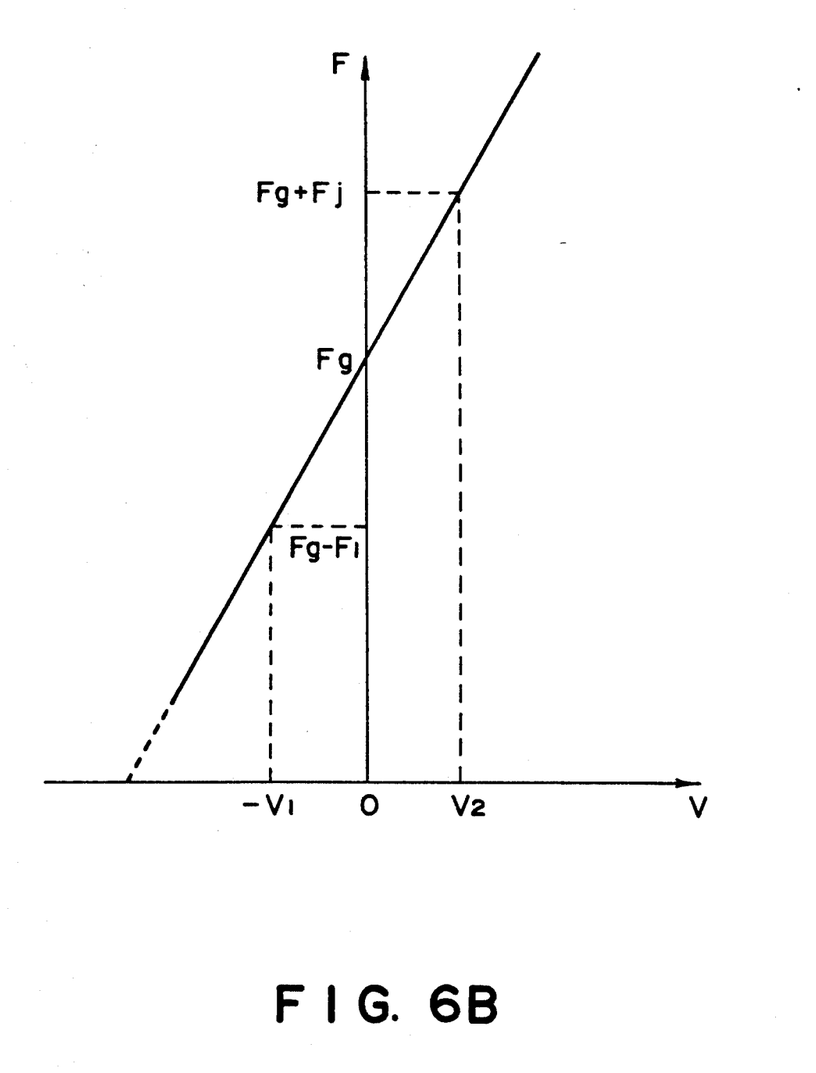

FIG. 6 shows the relationship between the velocity V of a specimen object in a laser Doppler velocimeter which uses diffraction grating and the Doppler frequency F. FIG. 6A shows a case where the diffraction grating is fixed; FIG. 6B shows a case where the movement speed of the diffraction grating is made to be Vg. As can be seen from these figures, in FIG. 6A, even if a certain frequency F; is detected, it is impossible to judge the direction of the movement of the diffraction grafting because the two velocities $V_1$ and $-V_1$ whose directions differ from each other match. However, in FIG. 6B, the Doppler frequency $F = Fg + F_1$ can be obtained for the velocity $V_1$, and the Doppler frequency $F = Fg - F_1$ can be obtained for the velocity $-V_1$. The direction of the velocity V can also be detected.

That is, if the movement velocity Vg of the diffraction grating is controlled, the following relation holds by using the above-mentioned equation (6):

$$V = F(d/2) - Vg \qquad (7)$$

Therefore, the detection of F enables V to be determined, as expressed by equation (7).

SUMMARY OF THE INVENTION

The present invention is an improved invention over the above-mentioned prior art. A primary object of the present invention is to provide a velocimeter having a relatively simple construction, which is more precise than the conventional one, in which no errors occur due to variations in the movement velocity, the eccentricity of the rotation, etc. of the diffraction grating.

These and other objects, features and advantages of the present invention will become clear when reference is made to the following description of the preferred embodiments of the present invention, together with reference to the accompanying drawings.

DESCRIPTION OF THE PREFERRED EMBODIMENTS

The embodiments of the present invention will be explained hereinbelow in detail with reference to the accompanying drawings.

Figure 7:
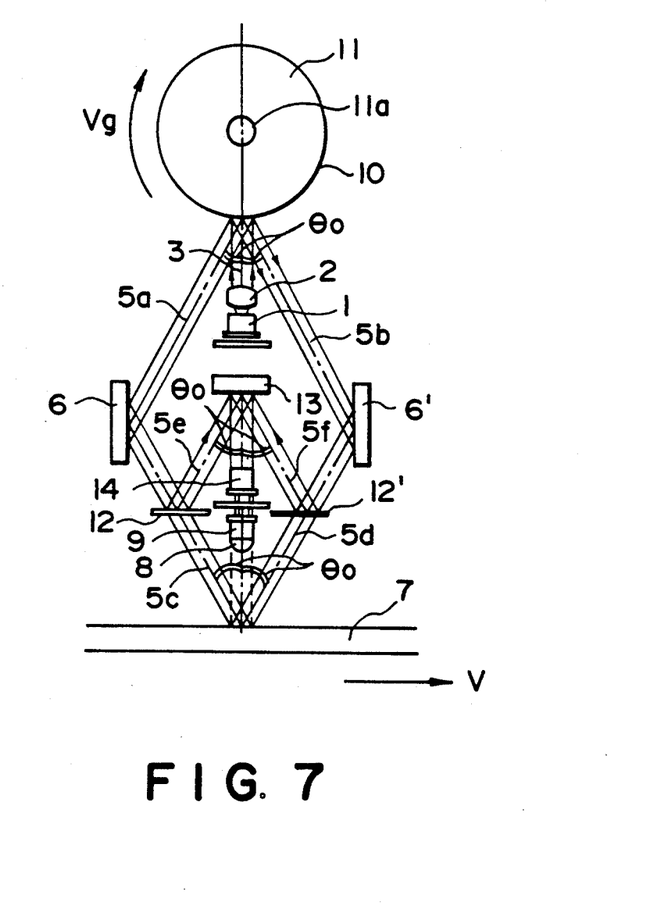
FIG. 7 is a view showing the construction of an embodiment of the present invention.

FIG. 7 shows the construction of an embodiment of the present invention. In FIG. 7, the diffraction grating 10 is arrayed on the side of a cylinder 11 with a grating pitch d being 1.6 $\mu$m. It is designed to be able to efficiently extract $\pm$n-th order diffracted lights. A laser beam having a wavelength of approximately 0.78 $\mu$m, which is emitted from the laser diode 1, is made into parallel light fluxes having a diameter of about 2 mm by means of the collimator lens 2. The cylinder 11 is mounted on the driving shaft 11a of a DC motor (not shown) and driven at a constant peripheral velocity Vg. When the parallel light fluxes 3 are made incident on the reflection type diffraction grating 10 formed on the periphery of the rotating cylinder 11, the $\pm$first order diffracted lights 5a and 5b are emitted at a diffraction angle $\theta \approx 29°$. On this occasion, since the diffraction grating 10 is moving at a peripheral velocity Vg, the diffracted lights 5a and 5b undergo positive and negative Doppler shifts $\pm$Vg/d, respectively. The diffracted lights 5a and 5b reflected on the mirrors 6 and 6' which are parallel to each other are each divided into two lights by half mirrors 12 and 12'. One of the two light fluxes is made into diffracted lights 5c and 5d and the two light fluxes are projected onto the specimen object 7; the other light flux is made into diffracted lights 5e and 5f and the two light fluxes are projected onto the a reflection type diffraction grating 13. The grating pitch d of the diffraction grating 13 has been set to 1.6 $\mu$m which is the same as the grating pitch of the diffraction grating 10 so that the diffracted light is efficiently generated in the direction of a photodetector 14.

The photodetector 9 receives the reflected scattered light generated from the specimen object 7 by the diffracted lights 5c and 5d and photoelectrically converts it. In this system, $\sin \theta_0/\lambda$ having an incident angle to the specimen object 7 which is made to be $\theta_0$, and a wavelength of light which is made to be $\lambda$, becomes constant in the same manner as described above. The photodetector 9 outputs a signal having a Doppler frequency shown below which is not dependent on the wavelength of a laser beam, which is proportional to the peripheral velocity Vg of the diffraction grating 10 and the movement velocity V of the specimen object 7, the Doppler frequency being obtained by substituting 1 for n in the above-mentioned equation (6):

$$F = 2(Vg + V)/d \quad (8)$$

Meanwhile, the photodetector 14 receives the reflected scattered light generated by the diffraction grating 13 by the diffracted lights 5e and 5f and photoelectrically converts it. In this system also, $\sin \theta_0/\lambda$ having an incident angle to the diffraction grating 13 which is made to be $\theta_0$ and a wavelength of light which is made to be $\lambda$ becomes constant. The photodetector 14 outputs a signal having a Doppler frequency shown below which is not dependent on the wavelength of a laser beam and which is proportional to the peripheral velocity Vg of the diffraction grating 10:

$$Fg = 2 Vg/d \quad (9)$$

Here, the computation of F−Fg yields the following: F−Fg =2 Vg/d. Thus, the movement velocity Vg of the diffraction grating is eliminated and the movement velocity V of the moving object can be determined. This computation will be performed as described below by using a processing circuit shown in FIG. 8.

Figure 8:
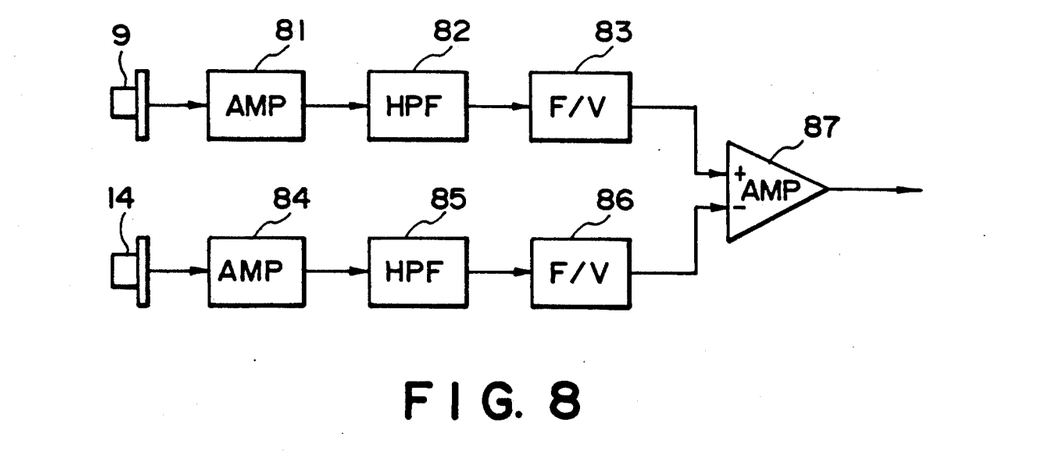
FIG. 8 is a view showing the electrical processing circuit of the embodiment.

As shown in FIG. 8, the output signal from the photodetector 9, i.e., the scattered light detection signal from the moving object 7, is amplified by an amplifier (AMP) 81. The signal amplified by the amplifier 81 is input to a frequency-voltage converter (F/V) 83 via a high-pass filter (HPF) 82. The frequency-voltage converter 83 outputs a signal according to F in the above-mentioned equation (8).

Meanwhile, the output signal from the photodetector 14, i.e., the scattered light detection signal from the diffraction grating 13, is amplified by an amplifier (AMP) 84. The signal amplified by the amplifier 84 is input to a frequency-voltage converter (F/V) 86 via a high-pass filter (HPF) 85. The frequency-voltage converter 86 outputs a signal according to F in the above-mentioned equation (9). Next, a differential amplifier 87 outputs a voltage of the difference between the voltage of the frequency-voltage converter 83 and that of the frequency-voltage converter 86 with the symbol $\pm$. That is, the differential amplifier 87 substantially performs the computation of F−Fg. This output voltage corresponds to 2 V/d, as shown in the above-mentioned equation (10). The absolute value thereof indicates the absolute value of the specimen object 7; the symbol $\pm$ indicates the direction of the movement. In the present embodiment, the symbol + indicates the direction of the arrow in FIG. 7.

According to this method, the reference point can be easily adjusted if the electrical circuit is set in such a way that the output of the differential amplifier 87 becomes zero when V=0 after the specimen object is stopped.

Figure 9:
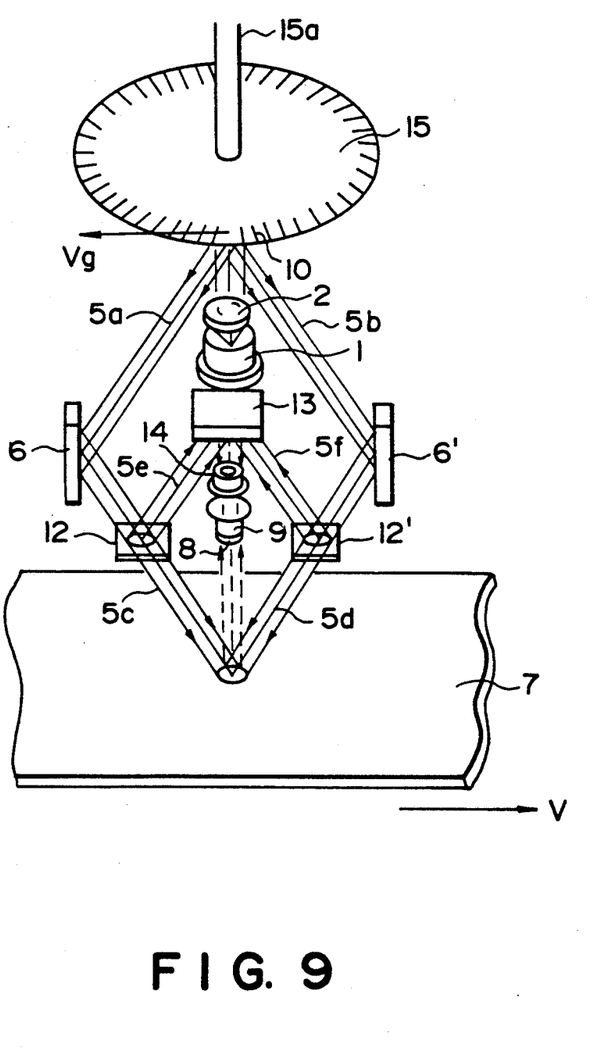
FIG. 9 is a view showing the construction of another embodiment.

Next, another embodiment of the present invention will be explained with reference to FIG. 9. The same reference numerals are used to indicate like elements in FIGS. 7 and 9.

Regarding the means for moving the diffraction grating in the above embodiment, the diffraction grating is moved by rotating a cylinder on whose side the diffraction grating is formed. In contrast, the present embodiment is characterized by the use of a disc instead of a cylinder.

The reflection type diffraction grating 10 having a grating pitch d of 1.6 $\mu$m is formed around the circumference of a rotating disc 15. The disc 15 is mounted on a driving shaft 15a of the motor. By rotating the driving shaft 15a, the disc 15 rotates, and the diffraction grating 10 formed on the disc 15 moves at a velocity Vg in relation to the incident light flux. Thus, diffracted lights 5a and 5b are produced. They have undergone a Doppler shift Vg by means of the diffraction grating 10, and can be measured by the same principle as that of the above embodiment.

The present invention is not limited to the forms of the above mentioned embodiments. Various modifications can be made. For example, transmission type diffraction gratings may be used for the diffraction grating 10 for producing diffracted light. The same effect can be obtained by using a scattering reflection member, for example, one in which the surface of an aluminum member is roughened, in place of the diffraction grating 13 which is used as a reference object.

The measurement of the velocity V is not limited to the method shown in FIG. 8. The velocity V may be determined by a method in which velocities V' (=V+Vg) and Vg are measured by using Doppler frequencies F and Fg and V is determined frp, V=V'−Vg.

Although an example was shown in the above-mentioned embodiments using the ± first-order diffracted lights emitted from the diffraction grating 10, ±n-th (n:natural number) order diffracted lights may be used. Also, light fluxes of different orders, for example, two light fluxes of zero order and n-th order, may be used.

According to the above-mentioned embodiments, detection accuracy is improved because measurement values are not affected by the speed of a moving diffraction grating. Also, it is not necessary to control the movement of the moving diffraction grating with a high degree of accuracy. A compact, low-cost apparatus can be used because the driving mechanism is simple.

Many different embodiments of the present invention may be constructed without departing from the spirit and scope of the present invention. It should be understood that the present invention is not limited to the specific embodiments described in this specification, except as defined in the appended claims.

What is claimed is:

1. An apparatus for detecting the velocity information light source means; of an object, comprising:
   frequency shifting means for shifting the frequency of a light flux from the light source means, said frequency shifting means having a diffraction grating moving along a predetermined direction, said diffraction grating generating a first light flux whose frequency is shifted and a second light flux directed differently from said first light flux;
   light-flux dividing means for dividing said first light flux into third and fourth light fluxes at a first position and said second light flux into fifth and sixth light fluxes at a second position, said third and fifth light fluxes divided by the light-flux dividing means being projected onto an object to be measured and said fourth and sixth light fluxes being projected on a position for combining said fourth and sixth light fluxes different from said first and second positions;
   first detection means for detecting light from the object to be measured to which said third and fifth light fluxes are projected, the light detected by the first detection means having undergone a Doppler shift relative to the velocity of the object to be measured;
   second detection means for detecting light generated by combining said fourth and sixth light fluxes at said position for combining; and
   velocity information detection means for detecting the velocity information of the object to be measured on the basis of a comparison of frequency between detection signals of the first and second detection means.

2. The apparatus according to claim 1, further comprising an optical system in which $\sin\theta_0/\lambda$ having an incident angle of said one of the light fluxes to the object to be measured which is made to be $\theta_0$ and a wavelength of light which is made to be $\lambda$ becomes constant.

3. The apparatus according to claim 1, wherein said velocity information detection means detects the velocity information of the object to be measured by detecting the difference between the frequency shifts of lights detected by the first and second detection means.

4. An apparatus according to claim 1, wherein one of a diffraction member and a scattering member is arranged at said position for combining, and said second detection means detects the light generated by combining diffracted or scattered light fluxes of said fourth and sixth light fluxes.

5. An apparatus for detecting the velocity information of an object, comprising:
   light source means;
   frequency shifting means for shifting the frequency of a light flux from the light source means;
   light-flux dividing means for dividing a light flux whose frequency is divided by the frequency shifting means, one of the light fluxes divided by the light-flux dividing means being projected onto an object to be measured and the other light flux being projected in a direction other than that of said one of the light fluxes;
   first detecting means for detecting light from the object to be measured to which said one of the light fluxes is projected, the light detected by the first detection means having undergone a Doppler shift relative to the velocity of the object to be measured;
   second detection means for detecting the other light flux;
   velocity information detection means for detecting the velocity information of the object to be measured on the basis of a comparison of frequency between detection signals of the first and second detection means; and
   a diffraction grating by means of which a light flux from said light source means is divided,
   wherein said frequency shifting means shifts the frequency of the first and second light fluxes, which are light fluxes divided by said diffraction grating,
   wherein the light-flux dividing means further divides the first light flux into a third and a fourth light flux, and further divides the second light flux into a fifth and a sixth light flux, wherein the first detection means detects light from the intersection section of the third and the fifth light fluxes on the object to be measured, and
   wherein the second detection means detects light from the intersection section of the fourth and the sixth light fluxes.

6. The apparatus according to claim 5, wherein the frequency shifting means shifts the frequency of each of the first and second light fluxes by moving said diffraction grating.

7. The apparatus according to claim 6, wherein said diffraction grating is cylindrical, and wherein the frequency shifting means rotates said cylindrical diffraction grating.

8. The apparatus according to claim 6, wherein said diffraction grating is disc-shaped, and wherein the frequency shifting means rotates said disc-shaped diffraction grating.

9. A method of detecting velocity information of an object, comprising the steps of:
   shifting the frequency of a light flux, said shifting being performed by using a diffraction grating moving along a predetermined direction, said diffraction grating generating a first light flux whose frequency is shifted and a second light flux directed differently from said first light flux;

dividing said first light flux into third and fourth light fluxes at a first position and said second light flux into fifth and sixth light fluxes at a second position, said third and fifth light fluxes divided by said light flux division being projected onto the object to be measured and said fourth and sixth light fluxes being projected on a position for combining said fourth and sixth light fluxes different than said first and second positions;

performing a first detection whereby light from the object to be measured to which the third and fifth light fluxes are projected is detected, said light having undergone a Doppler shift proportional to the velocity of the object to be measured;

performing a second detection whereby light generated by combining said fourth and sixth light fluxes at said position for combining the other light flux at said position for combining the other light flux is detected; and detecting the velocity information of the object to be measured on the basis of a comparison of frequency between detection signals of the first and second detections.

10. A method according to claim 9, wherein one of a diffraction member and a scattering member is arranged at said position for combining, and said second detection is performed by detecting the light generated by combining diffracted or scattered light fluxes of said fourth and sixth light fluxes.

11. The method according to claim 9, wherein said velocity information detection detects the velocity information of the object to be measured by detecting the difference between the frequency shifts of lights detected by the first and second detections.

12. A method of detecting velocity information of an object, comprising the steps of:

shifting the frequency of a light flux;

dividing the light flux whose frequency has been shifted, one of the light fluxes divided by said light flux division being projected onto the object to be measured and the other light flux being projected in a direction other than that of said one of the light fluxes.

performing a first detection whereby light from the object to be measured to which one of the light fluxes is projected is detected, said light having undergone a Doppler shift proportional to the velocity of the object to be measured, performing a second detection whereby the other light flux is detected, and detecting the velocity information of the object to be measured on the basis of a comparison between detection signals of the first and second detections, wherein a light flux from a light source is divided by a diffraction grating prior to the frequency shifting step, wherein said frequency shifting includes shifting the frequency of the first and second light fluxes, which are light fluxes divided by said diffraction grating, wherein the light-flux dividing further divides the first light flux into a third and a fourth light flux, and further divides the second light flux into a fifth and a sixth light flux, wherein the first detection detects light from the intersection section of the third and the fifth light fluxes on the object to be measured, and wherein the second detection detects light from the intersection section of the fourth and the sixth light fluxes.

13. The method according to claim 12, wherein the frequency shifting shifts the frequency of each of the first and second light fluxes by moving said diffraction grating.

14. The method according to claim 13, wherein said diffraction grating is cylindrical, and wherein the frequency shifting includes rotating said cylindrical diffraction grating.

15. The method according to claim 13, wherein said diffraction grating is disc-shaped, and wherein the frequency shifting includes rotating said disc-shaped diffraction grating.

16. The method according to claim 13, further comprising using an optical system in which $\theta_0/\lambda$ having the incident angle of one of the light fluxes to the object to be measured is made to be $\theta_0$ and a wavelength of light which is made to be $\lambda$ becomes a constant.

17. The method according to claim 12, wherein said velocity information detection detects the velocity information of the object to be measured by detecting the difference between the frequency shifts of lights detected by the first and second detections.

18. An apparatus for detecting velocity information of an object, comprising:

a light source;

a frequency shifter for shifting the frequency of a light flux from the light source, said frequency shifter having a diffraction grating moving along a predetermined direction, said diffraction grating generating a first light flux whose frequency is shifted and a second light flux directed differently from said first light flux;

at least one beam splitter for dividing said first light flux into third and fourth light fluxes at a first position and said second light flux into fifth and sixth light fluxes at a second position, said third and fifth light fluxes divided by said light flux division being projected onto the object to be measured and said fourth and sixth light fluxes being projected on a position for combining said fourth and sixth light fluxes different from said first and second positions;

a first photodetector for detecting the light from the object to be measured to which said third and fifth light fluxes are projected, the light detected by the first photodetector having undergone a Doppler shift proportional to the velocity of the object to be measured;

a second photodetector for detecting light generated by combining said fourth and sixth light fluxes at said position for combining; and a detection circuit for detecting the velocity information of the object to be measured on the basis of the comparison of frequency between detection signals from the first and second photodetectors.

19. An apparatus according to claim 18, wherein one of a diffraction member and a scattering member is arranged at said position for combining, and said second photodetector detects the light generated by combining diffracted or scattered light fluxes of said fourth and sixth light fluxes.

20. An apparatus for detecting velocity information of an object, comprising:

a system for generating two light beams directed in different directions from each other and each having a different frequency from each other, said two light beams enabling generation of a beat signal by interfering with each other;

an optical system for splitting one of said two light beams into a pair of split beams at a first position and the other of said two light beams into a pair of split beams at a second position, said optical system directing at least one of the split beams from the first position and one of the split beams from the second position to an object to be measured, and further directing the other split beam from the first position and the other split beam from the second position to a third position different from said first and second positions for combining the other split beams;

a first photodetector for detecting interference light generated by combining said split beams including a beam from the object to be measured to which at least one of said split beams is projected, the light detected by the first photodetector having undergone a Doppler shift proportional to the velocity of the object to be measured;

a second photodetector for detecting light generated by combining the other split beams at said third position; and a detection circuit for detecting the velocity information of the object to be measured on the basis of a comparison of frequency between detection signals from the first and second photodetectors.

21. An apparatus according to claim 20, wherein one of a diffraction member and a scattering member is arranged at said third position, and said second photodetector detects the light generated by combining diffracted or scattered beams of the other split beams.

22. An apparatus for detecting velocity information of an object, comprising:

a system for generating two light beams directed in different directions from each other each having a different frequency from each other, said two light beams enabling generation of a beat signal by interfering with each other;

an optical system for splitting one of said two light beams into a first pair of split beams and the other of said two light beams into a second pair of split beams, said optical system directing one split beam of the first pair of split beams and one split beam of the second pair of split beams to an object to be measured, and further directing the other split beam of the first pair of split beams and the other split beam of the second pair of split beams in respective directions for combining the other split beams, said optical system being arranged so that optical paths of said two light beams are almost symmetric and optical paths of said first pair of split beams and optical paths of said second pair of split beams are almost symmetric;

a first photodetector for detecting light from the object to be measured to which said split beams are projected, the light detected by the first photodetector having undergone a Doppler shift proportional to the velocity of the object to be measured;

a second photodetector for detecting light generated by combining the other split beams at said third position; and a detection circuit for detecting the velocity information of the object to be measured on the basis of a comparison of frequency between detection signals from the first and second photodetectors.

* * * * *

UNITED STATES PATENT AND TRADEMARK OFFICE
CERTIFICATE OF CORRECTION

PATENT NO. : 5,229,830
DATED     : July 20, 1993
INVENTOR(S) : YASUHIKO ISHIDA ET AL.

It is certified that error appears in the above-identified patent and that said Letters Patent is hereby corrected as shown below:

COLUMN 2

Line 11, "ultrasmall" should read --ultra-small--.
    Line 29, "velocimeter" should read --velocimeters--.
    Line 39, "(n: 1, 2,..." should read --(n: 1, 2,...)--.

COLUMN 3

Line 29, "G-LDv," should read --G-LDV,--.
    Line 63, "interfer" should read --interfere--.

COLUMN 4

Line 19, "F;" should read --$F_1$--.

COLUMN 7

Line 7, "frp," should read --from--.
    Line 30, "light source means;" should be deleted.

Signed and Sealed this

Seventh Day of June, 1994

*Attest:*

BRUCE LEHMAN

*Attesting Officer*    Commissioner of Patents and Trademarks